United States Patent [19]

Carlton et al.

[11] 4,218,742
[45] Aug. 19, 1980

[54] SYSTEM FOR CONTROLLING A SERIAL DATA CHANNEL WITH A MICROPROCESSOR

[75] Inventors: James E. Carlton; Werner J. Schaeuble, both of San Jose, Calif.

[73] Assignee: International Business Machines Corporation, Armonk, N.Y.

[21] Appl. No.: 921,146

[22] Filed: Jun. 30, 1978

[51] Int. Cl.$^2$ ............................................. G06F 13/00
[52] U.S. Cl. .................................................... 364/200
[58] Field of Search ... 364/200 MS File, 900 MS File; 360/48

[56] References Cited

U.S. PATENT DOCUMENTS

| | | | |
|---|---|---|---|
| 3,516,074 | 6/1970 | Enomoto et al. | 364/900 |
| 3,587,044 | 6/1971 | Jenkins | 364/200 |
| 4,025,957 | 5/1977 | Wada et al. | 360/48 |
| 4,071,889 | 1/1978 | Sumida et al. | 364/900 |
| 4,155,117 | 5/1979 | Mitchell et al. | 364/200 |

Primary Examiner—Raulfe B. Zache
Attorney, Agent, or Firm—Richard E. Cummins

[57] ABSTRACT

A control system for a serial data channel for a disk file is disclosed in which a microcontroller is used as the control means. The microcontroller has an input port and an output port, while the serial data channel has a data register. The connections of the data register to the input and output port and the parallel by bit input and output busses on which write data and read data is sent provides a plurality of different data transfer loops through the data register which can be selected under the control of the microcontroller. The arrangement permits functions to be achieved by the microcontroller that heretofore were performed by another device connected to the controller or by special hardware.

13 Claims, 3 Drawing Figures

SYSTEM FOR CONTROLLING A SERIAL DATA CHANNEL WITH A MICROPROCESSOR

DESCRIPTION

1. Technical Field

This invention relates to a system to control the transfer of data from one device to another and, in particular, to the control of a serial data channel of a disk file by means of a microprocessor.

2. Background Art

Various arrangements are known in the art for transferring data which is received at a disk file controller in parallel by bit form to a disk file in serial by bit form to be written on one of the tracks, and the reverse process of transferring the serial by bit data stream generated by reading the stored data from the file controller in parallel by bit form. In such systems, the input data bus to the controller is connected to a register which acts as a parallel to serial convertor for the input data in that each bit of the byte is clocked out by a bit ring counter and supplied to the appropriate encoding circuitry. On reading data from the file, the same register or a similar register operates as a deserializer by clocking bits which have been decoded into the appropriate stages of the register and then subsequently gating the output of the register to the data output bus of the controller. The data input bus, register, serializer and encoder, the decoder and deserializer, and the output bus are generally referred to as the serial data channel.

The control of a serial data channel involves several considerations since, in addition to the data that is to be recorded on the file, other format type of information is also recorded at the beginning of the data stream, intermediate of data bytes in the stream, or at the end of the data stream, or a combination of all of the above. In some situations, the format information is prerecorded on the track so that the serial recording channel must switch from writing to reading or spacing over this prerecorded data.

In many prior art systems, the format data is supplied from the device which is supplying the data, e.g., the control unit. In other arrangements, the disk file controller includes special hardware for controlling the formatting of the data. In either case, a change in the format of a record, or sometimes an increase in the recording density, requires a redesign and complete replacement of the formatting hardware.

Arrangements have been suggested in the prior art wherein a microprocessor is used in the disk file control unit connected to the file controller, whereby a microprocessor controls the formatting function. If a disk drive with a new format is to be attached to the control unit, the microprogram can be changed provided that the speed of the microprocessor is sufficient to match the requirements of the new format, both from the control and data transfer standpoints. It is also known in the art to provide a microprocessor to control the transfer of data between a disk file control unit and a disk file where the transfer is in a parallel by bit mode and where the microprocessor controls the serial read channel to the drives to the extent it connects the input and output of this channel to the control unit interface. However, there is no direct control of the serial channel by the microprocessor of the controller and no ability of the serial channel to exchange data back and forth with the microprocessor. As a result, special hardware is still required for formatting operations and appropriate control signals must be sent from the control unit to the processor directly in order to control the special hardware.

The present invention provides a system in which the register of a conventional serial data channel interfaces directly with the input and output port of the microprocessor independent of the other interfaces which the microprocessor controls. Such an arrangement allows a byte of data to be placed in the register directly from the microprocessor, or a byte of data that is in the register to be supplied directly to the microprocessor.

DISCLOSURE OF INVENTION

Figure 1:
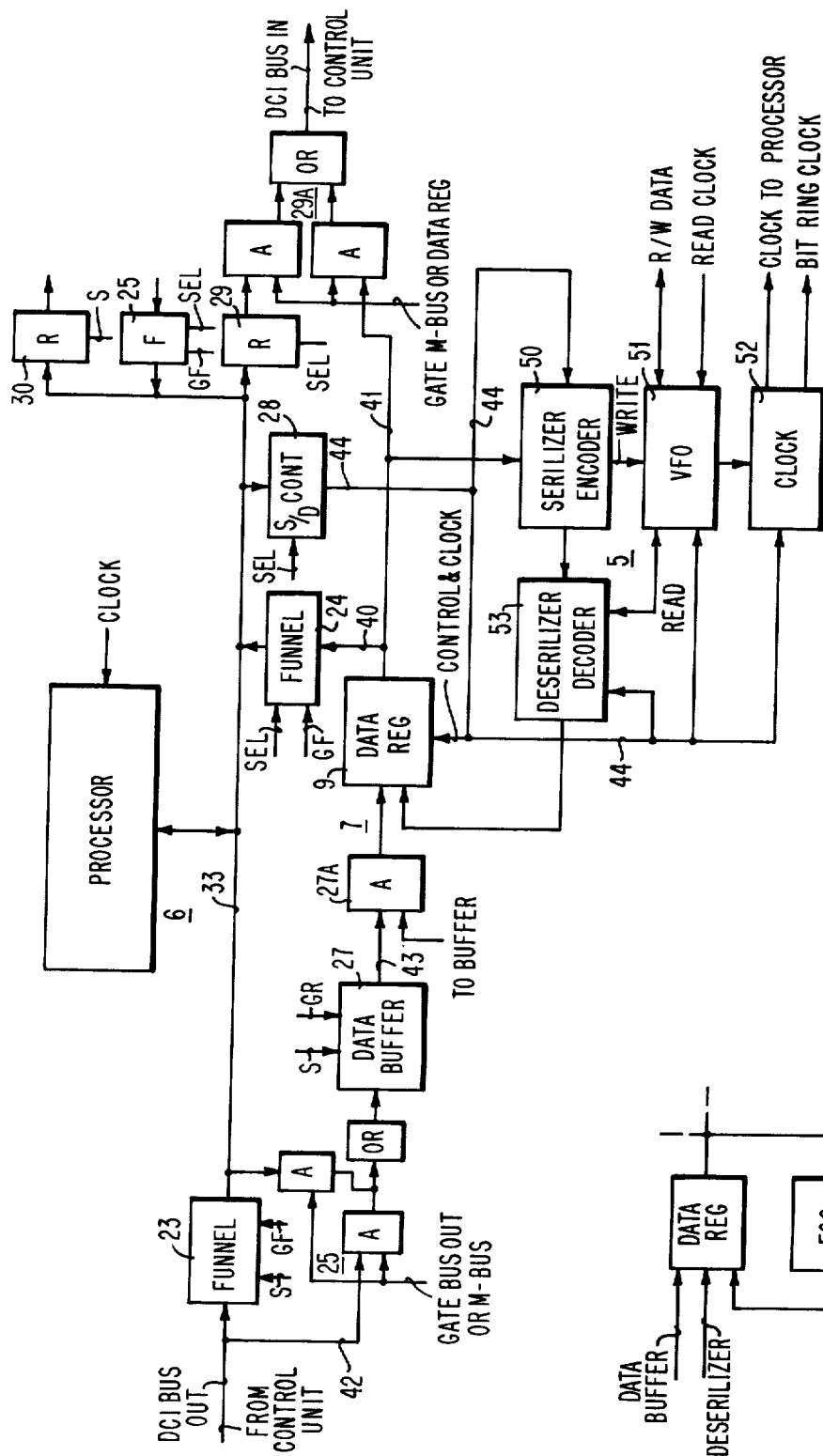
FIG. 1 illustrates in block form the serial data channel interconnected to the input ports of a microprocessor in accordance with the present invention.

With reference to FIG. 1, the system of the present invention comprises a serial channel 5, a microprocessor 6, only part of which is shown, and the interface 7 between the serial channel and the microprocessor.

The portion of the microprocessor as shown represents the input and output of a microprocessor which is used to control the transfer of parallel by bit data between the file control unit and the file controller. Another interface, referred to generally as the FCI interface, also interconnects the output of the controller to the parallel by bit input to and from the file and is in addition to the serial channel interface from the controller to the disk drive which is used for writing and reading data. Such a controller is described in detail in co-pending application Ser. No. 921,147, filed June 30, 1978. As described in the above-mentioned copending application, the microcontroller is provided with a plurality of input funnels which are adapted to be interconnected between the outputs of the two interfaces and the bidirectional data bus which forms the input to the microprocessor. In addition, the microcontroller includes a plurality of external registers whose inputs are connected in parallel to the bidirectional data bus and whose outputs are connected to the inputs of the two interfaces. Each of these funnels and registers are directly addressable by one or more of the instructions which control the specific operation of the processor. In the disclosed microcontroller, the processor performs the function in response to one instruction and in one cycle time of transferring a byte of data from an addressed input funnel to an addressed output register. The processor also has the capability, in response to the same instruction, of changing either the source or destination of data so that a byte of data stored in the memory of the microprocessor may be transferred to an external register in one machine cycle, or from an external funnel which has been addressed to an internal addressed register in memory in one machine cycle.

Funnels 23, 24, and 25, as shown in FIG. 1, correspond in general function and operation to the external funnels shown in said copending application. Likewise, registers 27, 28, 29, and 30 correspond in general function and operation to the external registers shown in said copending application. These funnels and registers are connected in parallel to the bidirectional data bus 33 which is the input and output ports of the microprocessor 6.

Figure 2:
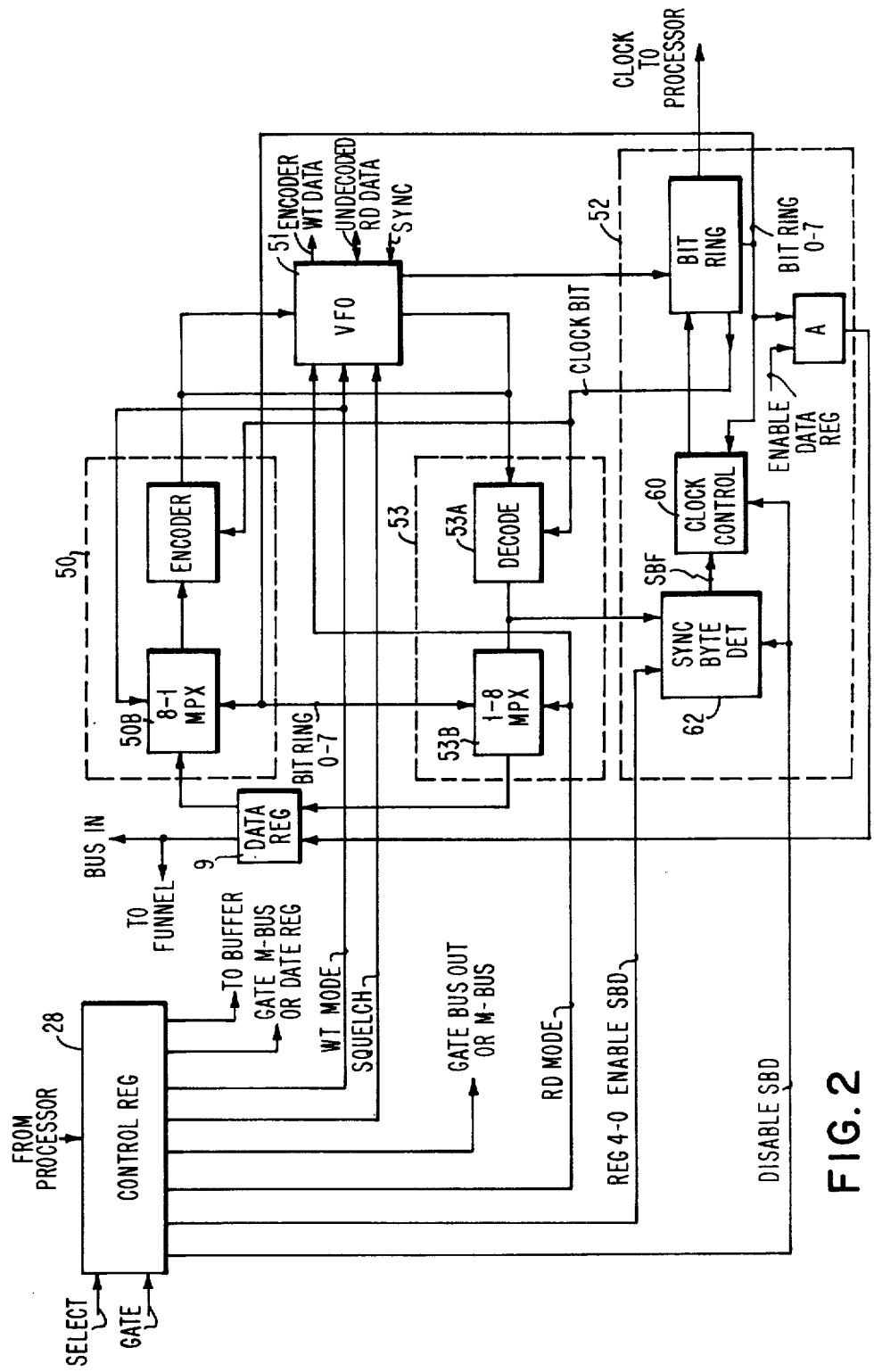
FIG. 2 illustrates the control signals supplied to the control register in FIG. 1 and their interaction with the various blocks of the serial data channel.

The interface of the serial channel to the microprocessor, as shown in FIG. 1, consists of the parallel by bit busses 40 and 41 from the output of the data register 9 to the input of funnel 24 and logic unit 29A, respectively, the extension 42 interconnecting the DCI Bus Out to the input of output register 27, the connection of bus 43 of the output register 27 to one input of the data register 9, and lastly, the bus 44 from the output of register 28 to control various functional blocks of the serial channel, which is shown in more detail in FIG. 2 and explained later in the specification.

It will be seen with reference to FIG. 1 that several data flow paths may be selectively established in the system under the control of the microprocessor. The input to the data register 9 may come from the DCI Bus Out 20 directly through register 27, from funnel 23 through the microprocessor where it could be changed or operated on, or directly from the microprocessor through register 27. The output of the data register may be transferred to the DCI Bus In directly, or through funnel 24 to register 29 directly, or through the microprocessor 6 where it can be operated on, or stored in some preselected memory location in the processor. The output of the data register 9 can also be written to the input of data register 9 through funnel 24, bus 33, microprocessor 6, and register 27 which allows the microprocessor to check the data register, the funnel, the bidirectional data bus, and the data buffer in the event an error occurs somewhere in that loop. This checking can be done directly by the microprocessor.

The processor also has the capability of providing control words selectively to control register 28 and data register 9, which allows any formatting of the data to be done directly by the microprocessor. The conventional serial data path to and from the disk drives is not interfered with and operates in a conventional manner.

The serial data channel as shown in FIG. 1 comprises the data register 9, the serializer 50, the VFO 51, the clock 52, and the deserializer 53, each of which are supplied with control signals from control bus 44 of control register 28 and appropriate timing signals from clock generator 52, as shown in detail in FIG. 2.

FIG. 2 shows the details of the connections of the output control register 28 to the various functional blocks of the serial data channel.

The control register 28 includes a number of stages, each of which is associated with one or more control functions. The control register can be changed each byte time since, as mentioned earlier, the microprocessor 6 is synchronized to the variable frequency oscillator of the serial data channel and has a machine cycle which is at least as fast as one byte time of the rate at which data is being recorded.

The VFO 51 operates basically in two modes, i.e., a write mode wherein encoded data is being sent to the file and a read mode wherein data is being read from the file. In the write mode, the VFO is phase locked to some suitable clock source, such as the servo clock signals. In the read mode, the VFO is synchronized by the raw read data from the selected drive. The Squelch Input signal is used to initiate operation of the VFO at its free running frequency. The output of the VFO is supplied to the clock generator 52 which may comprise a suitable bit ring counter and other suitable circuitry to provide bit ring signals 0-7 and byte time signals to various components of the system. The clock generator 52 includes the clock control unit 60. The clock control unit 60 has three input signals, Sync Byte Found (SBF), Disable SBD from the control register, and BR7 fed back from the bit ring to insure that if the counter is stopped, it stops at the end of bit 7 time. The clock controls are turned on by the signal SBF from the Sync Byte detector 62 and turned off by the Disable SBD signal at BR7 time.

The function of the Sync Byte detector 62 is to recognize a sync byte or some other special character which is recorded on the track immediately ahead of or some predetermined byte distance ahead of the location where the first byte of data is to be recorded. The Sync Byte detector 62 has an input connected to the output of the decoder 53A. The Sync Byte detector 62 is turned on at the beginning of a read operation to allow the decoded data to be examined for the special pattern. On detecting the special pattern, the clock controls are set to control the bit ring clock of the clock generator and transfer of data from data register 9.

The parallel to serial convertor 50B and serial to parallel convertor 53B are also controlled by the read mode and write mode signals from the control register 28, along with the bit clock generator. As shown in FIG. 2, these units are separate from the encoder, decoder and data register. Their function may, of course, be embodied as part of these units, if desired, in any of the well known ways suggested by the prior art. The input to data register 9 from bus 43 also includes a gate 27A which is enabled by the "To Buffer" signal from register 28.

The Enable Data Register Clock signal supplied from control register 28 is used to allow bit 7 of the bit ring clock to transfer data out of the data register. The last two control signals from register 28 determine respectively if registers 27 and 29 are connected to the bus 33. The Gate M bus or DCI Bus Out Signal supplied to logic unit 25 selects the input to data buffer 27. As shown in FIG. 2, the "To Buffer" signal supplied to AND Gate 27A controls one of the inputs to the data register. The Gate M Bus or Data Register signal from register 28, to logic unit 29A, determines the source of data supplied to DCI Bus In.

Figure 3:
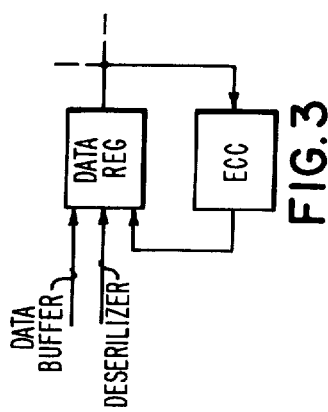
FIG. 3 illustrates how an error correcting check byte generator may be interconnected with the system shown in FIG. 1.

FIG. 3 illustrates how a system for generating error correcting check bytes may be connected into the data register 9 of the serial data channel shown in FIG. 1 for providing an ECC system access to the microprocessor to the same extent as the serial channel has access on a time-sharing basis.

An ECC system which may be employed as shown in FIG. 3 is disclosed in detail in copending application Ser. No. 921,148, filed June 30, 1978.

The operation of the system shown in FIGS. 1-3 will now be described in connection with a typical operation involving the transfer of data between a file control unit and disk drive in which data to be recorded is received at the controller on a parallel by bit bus functionally equivalent to DCI Bus Out, as shown in FIG. 1.

It will be assumed for purposes of this description that the rate at which data is being sent from the control unit is under the control of other hardware such that a byte of data is received at the appropriate data rate. Such a system for controlling the parallel by byte data transfer between the control unit and the controller is disclosed in copending application Ser. No. 921,150, filed June 30, 1978. As described herein, a "Sync In"

signal is used to request each byte of data from the control unit when a plurality of bytes are to be transferred sequentially, and a "Sync Out" signal from the control unit received at the controller signifies that each byte of data is available to register 27 of the serial channel and can be transferred to the processor. The "Sync In-Sync Out" system insures a continuous stream of data in parallel by bit form to the data buffer register 27 at T4 time, since the control register has selected DCI Bus Out as the input to register 27.

It is further assumed that the control unit has sent to the controller a suitable command indicating that the next N number of bytes received are to be recorded on the selected drive, and that the input to data register 9 from register 27 has been selected by control register 28 allowing the "To Buffer" signal to be active. The first byte of data is transferred to the data register 9 at T7 of the byte time in which it is received at register 27. The control register 28 has enabled the clock input to the data register 9 and the serializer 50 so that data in register 9 is converted to bit stream of encoded data supplied to VFO 51. VFO 51 has been put in the write mode by the control register 28 activating the write mode line so that the serial encoded data is synced to the VFO oscillator and sent to the selected drive where it is recorded. At the end of the N bytes specified by the write command, the microprocessor changes the word in the control register 28 at T4 of the byte time when the nth byte is in the data register 9 to deactivate the "To Buffer" signal. This prevents further input on bus 43 during subsequent byte times. If, as shown in FIG. 3, an ECC system is connected to the data register for generating ECC check bytes, the check bytes which have been generated as the data is sent to the drive can now be sent to the data register following the last data byte. The output of the ECC system can be connected to the data register 9 in the same manner as the serial channel is and can be under the control of the microprocessor by using another register similar to register 28 for this control, or a separate control system can be used.

After the last byte of data or the last ECC check byte has been serialized, the clock control to the data register and the serializer are deactivated by again changing the control word in register 28. The VFO can be left in the write mode until changed by a subsequent operation. A read operation requires another control word which activates the line to the VFO, identified as Read Mode, and enables the clock generator 52, deserializer 53, and Sync Byte detector 62. As shown in FIG. 2, a read operation involves, first, locating the start of the data field to be read and then reading that data. In this instance, the start of the data field is determined by a sync byte which is recorded immediately prior to the first byte of data. A system for writing a sync byte is disclosed in copending application Ser. No. 853,377, filed Nov. 21, 1977, and may be employed in the present system.

The function of the Sync Byte detector 62 is to recognize the unique sync byte pattern and turn on the clock control unit 60 so that the next byte of data is loaded into the data register 9 at T7 time of the next cycle, or byte.

Control register 28 also enables the Serdes bus input to logic unit 29A so that prior to bit 7 time of the succeeding byte times the data in data register 9 can be transferred to register 29 where it is sent to the control unit on DCI Bus In.

If at the end of the reading operation the ECC system indicates an error, the ECC syndrome bytes can be sent either directly to the microprocessor through the data register and the funnel 24, or to the unit attached to the DCI Bus In to determine the type of error and its location by suitable processing of these error syndromes.

While the invention has been particularly shown and described with reference to a preferred embodiment thereof, it will be understood by those skilled in the art that various changes in the form and details may be made therein without departing from the spirit and scope of the invention.

Having thus described our invention, what we claim as new, and desire to secure by Letters Patent is:

1. A system for controlling the bidirectional transfer of data through a serial data channel connected between a first parallel by bit interface and a second serial by bit interface, said system comprising:

a serial data channel including a first means for converting a parallel by bit input signal to a serial by bit output signal for said second interface and a serial by bit input signal from said second interface to a parallel by bit output signal, and a register for storing each said parallel by bit signal;

a microprocessor having a parallel by bit input port and a parallel by bit output port, each of which includes a plurality of instruction addressable units for transferring a byte of data to or from the processor;

means for selectively connecting said parallel by bit interface to the input of said register or one of said input port units;

means selectively connecting the output of said register to another said input port unit or to said first interface; and control means including said microprocessor and clock circuits connected to said serial channel to cause a byte of data presented to said first interface to be transferred to either said microprocessor in parallel by bit form or to said second interface in serial by bit form through said register, or a byte of data presented to said second interface in serial by bit form to be transferred to said microprocessor or said first interface in parallel by bit form through said register.

2. The system recited in claim 1 in which said means for connecting said parallel by bit interface to the input of said register includes one of said units ... said input port having its input connected to said parallel by bit interface and its output connected to said register.

3. The system recited in claim 1 in which said means for selectively connecting the output of said register to said first interface includes one of said units of the output port having its input connected to the output of said register and its output connected to said first interface.

4. A system for controlling the bidirectional transfer of data through a serial data channel connected between a first parallel by bit interface and a second serial by bit interface, said system comprising:

a serial data channel including a first means for converting a parallel by bit input signal to a serial by bit output signal for said second interface and a serial by bit input signal from said second interface to a parallel by bit output signal, and a register for storing each said parallel by bit signal;

a microprocessor having a parallel by bit input port and a parallel by bit output port, each said port including a plurality of instruction addressable units, said units associated with said input port having their respective outputs connected in parallel to said processor, said units associated with said output port having their inputs connected in parallel to said processor;

means selectively connecting said parallel by bit input signal from said first interface to the input of one of said units associated with said input port and to the input of a second one of said units associated with said output port;

means connecting the output of said second one of said units associated with said output port to the input of said register; and control means having an output connected to the input of still another said unit associated with said output port and a plurality of output control lines connected to said serial data channel and said microprocessor whereby the transfer of data from said first to said second interface is controlled by said microprocessor.

5. The system recited in claim 4 further including means selectively connecting the output of said register to another said unit associated with said input port.

6. The system recited in claim 5 further including means selectively connecting the output of said register to the input of another said unit associated with said output port.

7. The system recited in claim 6 in which said first parallel by bit interface is adapted to be connected to a control unit and said second serial by bit interface is connected to a disk drive.

8. The system recited in claim 6 in which another said unit associated with said output port is adapted to be connected to the input of said control unit to supply a byte of data thereto from either said register or from said microprocessor.

9. The system recited in claim 6 in which said serial channel includes means for encoding interconnected between the output of said register and said serial by bit interface.

10. The system recited in claim 9 in which said encoding means includes a parallel to serial convertor.

11. The system recited in claim 6 in which said serial channel includes means for decoding interconnected between the input to said register and said second interface.

12. The system recited in claim 11 in which said means for decoding includes a serial to parallel convertor.

13. The system recited in claim 1, further including:

a subsystem for generating error correcting check bytes for the data transferred to second interface, said subsystem having a parallel by bit input connected to the output of said register and a parallel by bit output connected to the input of said register; and means for selectively controlling said subsystem to supply generated ECC check bytes to said second interface and generated syndrome bytes to said first interface or said microprocessor.

* * * * *